(12) United States Patent
Zuber et al.

(10) Patent No.: US 7,993,499 B2
(45) Date of Patent: *Aug. 9, 2011

(54) MEMBRANE ELECTRODE UNIT FOR THE ELECTROLYSIS OF WATER

(75) Inventors: Ralf Zuber, Großostheim (DE); Klaus Schaack, Obernburg (DE); Sandra Wittpahl, Herzogenaurach (DE); Holger Dziallas, Hanau (DE); Peter Seipel, Alzenau (DE); Pia Braun, Langenselbold (DE); Lutz Rohland, Hanau-Grossauheim (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 796 days.

This patent is subject to a terminal disclaimer.

(21) Appl. No.: 10/564,798
(22) PCT Filed: Jul. 14, 2004
(86) PCT No.: PCT/EP2004/007802
§ 371 (c)(1), (2), (4) Date: Jun. 21, 2007
(87) PCT Pub. No.: WO2005/006480
PCT Pub. Date: Jan. 20, 2005

(65) Prior Publication Data
US 2008/0067061 A1 Mar. 20, 2008

Related U.S. Application Data

(63) Continuation-in-part of application No. 10/699,158, filed on Oct. 30, 2003.

(30) Foreign Application Priority Data

Jul. 14, 2003 (DE) .................................. 103 31 836

(51) Int. Cl.
*C25B 9/10* (2006.01)
*H01M 8/10* (2006.01)

(52) U.S. Cl. ........ 204/252; 204/296; 204/263; 204/265; 204/266; 429/480; 429/481; 429/482; 429/483; 429/491; 429/492; 429/493; 429/494; 429/495; 429/496; 429/507; 429/508; 429/509; 429/523; 429/526; 429/534; 429/535

(58) Field of Classification Search .................. 204/252, 204/296, 263, 265, 266; 429/34, 35, 36, 429/40, 41, 44, 480–483, 491–496, 507–509, 429/523, 526, 529, 534, 535
See application file for complete search history.

(56) References Cited

U.S. PATENT DOCUMENTS
4,555,324 A 11/1985 Ueno et al.
(Continued)

FOREIGN PATENT DOCUMENTS
CN 1269429 A 10/2000
(Continued)

OTHER PUBLICATIONS
International Search Report for PCT/EP2004/007802 dated Mar. 7, 2006. (2 pages).
(Continued)

*Primary Examiner* — Bruce F Bell
(74) *Attorney, Agent, or Firm* — Levin Santalone LLP; John Santalone

(57) ABSTRACT

The invention relates to membrane-electrode assemblies for the electrolysis of water (electrolysis MEAs), which contain an ion-conducting membrane having a front and rear side; a first catalyst layer on the front side; a first gas diffusion layer on the front side; a second catalyst layer on the rear side, and a second gas diffusion layer on the rear side.

Figure 1:
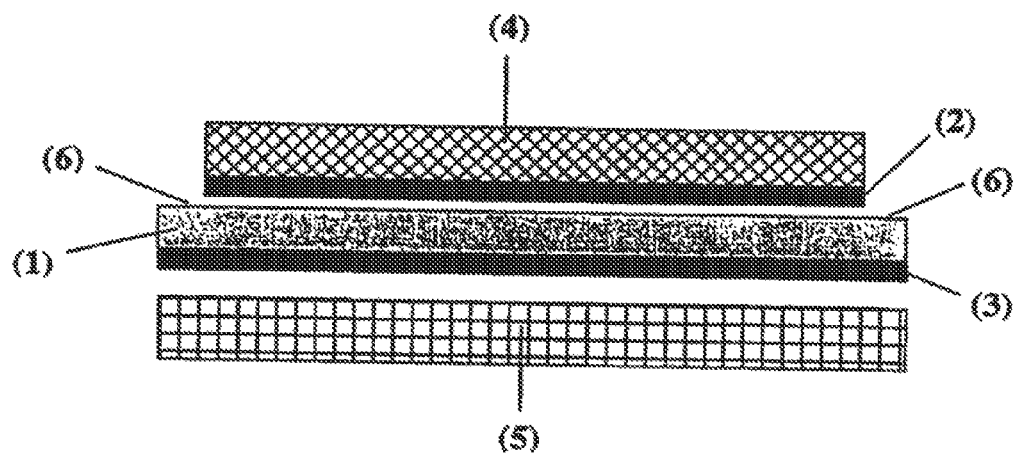

The first gas diffusion layer has smaller planar dimensions than the ion-conducting membrane, whereas the second gas diffusion layer has essentially the same planar dimensions as the ion-conducting membrane ("semi-coextensive design"). The MEAs also comprise an unsupported free membrane surface that yields improved adhesion properties of the sealing material. The invention also relates to a method for producing the MEA products.

Pressure-resistant, gastight and cost-effective membrane-electrode assemblies are obtained, that are used in PEM water electrolyzers, regenerative fuel cells or in other electrochemical devices.

11 Claims, 1 Drawing Sheet

U.S. PATENT DOCUMENTS

| | | | |
|---|---|---|---|
| 4,652,502 A | 3/1987 | Breault et al. | |
| 5,176,966 A | 1/1993 | Epp et al. | |
| 5,187,025 A | 2/1993 | Kelland et al. | |
| 5,264,299 A | 11/1993 | Krasij et al. | |
| 5,464,700 A | 11/1995 | Steck et al. | |
| 5,858,569 A | 1/1999 | Meacher et al. | |
| 5,861,222 A | 1/1999 | Fischer et al. | |
| 5,945,192 A | 8/1999 | Kato et al. | |
| 6,020,083 A | 2/2000 | Breault et al. | |
| 6,057,054 A | 5/2000 | Barton et al. | |
| 6,159,628 A | 12/2000 | Grasso et al. | |
| 6,197,147 B1 | 3/2001 | Bonsel et al. | |
| 6,245,454 B1 | 6/2001 | Gocho et al. | |
| 6,309,772 B1 | 10/2001 | Zuber et al. | |
| 6,500,217 B1 | 12/2002 | Starz et al. | |
| 6,613,215 B2 | 9/2003 | Molter et al. | |
| 6,692,860 B2 | 2/2004 | Inoue | |
| 7,267,902 B2 | 9/2007 | Brunk | |
| 2002/0051902 A1 | 5/2002 | Suenaga | |
| 2002/0079235 A1 | 6/2002 | Molter et al. | |
| 2002/0150810 A1 | 10/2002 | Mizuno | |
| 2003/0049367 A1 | 3/2003 | Biegert | |
| 2003/0049518 A1* | 3/2003 | Nanaumi et al. | 429/44 |
| 2003/0057088 A1 | 3/2003 | Ichikawa | |
| 2003/0157397 A1 | 8/2003 | Barton | |
| 2004/0058223 A1 | 3/2004 | Shibata | |
| 2004/0086775 A1* | 5/2004 | Lloyd et al. | 429/44 |
| 2004/0214057 A1 | 10/2004 | Fuglevand | |
| 2004/0214064 A1* | 10/2004 | Cavalca et al. | 429/33 |
| 2005/0014056 A1* | 1/2005 | Zuber et al. | 429/34 |
| 2005/0100776 A1 | 5/2005 | Brunk | |
| 2005/0255372 A1 | 11/2005 | Lertola | |
| 2007/0196717 A1 | 8/2007 | Kuroki | |
| 2007/0215461 A1* | 9/2007 | Zuber et al. | 204/280 |
| 2007/0231689 A1* | 10/2007 | Zuber et al. | 429/209 |
| 2007/0298302 A1* | 12/2007 | Oschmann | 429/33 |
| 2009/0053583 A1* | 2/2009 | Binder et al. | 429/44 |

FOREIGN PATENT DOCUMENTS

| | | |
|---|---|---|
| EP | 0 951 086 A2 | 10/1999 |
| EP | 0 951 086 A3 | 10/2001 |
| EP | 1 289 042 A2 | 3/2003 |
| EP | 1 289 042 A3 | 3/2003 |
| EP | 0 951 086 B | 1/2005 |
| JP | 09-063622 A | 3/1997 |
| JP | 09 063622 A | 3/1997 |
| JP | 09 289028 A | 11/1997 |
| JP | 11 045729 A | 2/1999 |
| JP | 2000-212785 A | 8/2000 |
| JP | 2003-68323 A | 3/2003 |
| WO | WO 02/27845 A2 | 4/2002 |

OTHER PUBLICATIONS

International Search Report for PCT/EP2004/007794 dated Sep. 19, 2005. (3 pages).

U.S. Appl. No. 10/564,794, Zuber et al.

Written Opinion of the International Searching Authority for PCT/EP2004/007794.

* cited by examiner

MEMBRANE ELECTRODE UNIT FOR THE ELECTROLYSIS OF WATER

CROSS REFERENCE TO RELATED APPLICATIONS

This application is a continuation-in-part application of U.S. Ser. No. 10/699,158, filed 30 Oct. 2003, the entire disclosure of which is hereby incorporated by reference into the present application.

The present invention describes a membrane-electrode assembly ("MEA") for use in PEM water electrolysers. In addition, the membrane-electrode assembly can also be used for regenerative fuel cells (RFCs) or for oxygen-producing electrodes in various other applications of electrolysis. Furthermore, a process for producing the membrane-electrode assembly is described.

In a future energy economy based on renewable resources, hydrogen will become an important energy carrier. The electrolysis of water is the most practicable method of producing hydrogen using renewable energy sources. The capital and production costs for electrolysers determine the overall economics of the system and will therefore determine whether this becomes a practical process for producing hydrogen. The costs of production of hydrogen by electrolysis of water are influenced to a large extent by the consumption of electric energy, which can make up about 70% of the total costs for the production of hydrogen.

According to the present state of the art, use is usually made of two different types of cell for the electrolysis of water, namely alkaline electrolysers and electrolysers which are provided with a polymer electrolyte membrane ("PEM"). Water electrolysers which utilize a PEM in combination with noble metal catalysts are able to operate at significantly higher current densities and thus with a lower specific energy consumption compared to conventional, alkali-containing electrolysers, so that they have the advantage of higher output of the plants and lower production costs. The present invention therefore has the object of improving the process of electrolysis of water by means of PEM electrolysers and in particular of providing improved membrane-electrode assemblies (MEAs) for PEM electrolysers.

PEM electrolysers generally have a similar structure to a PEM fuel cell, but they operate in a different way. During operation of the PEM fuel cell, reduction of oxygen takes place at the cathode and oxidation of hydrogen takes place at the anode of the fuel cell. The end effect is that water and electric power are produced. On the other hand, flow of current and electrodes are reversed in a PEM electrolyser, so that decomposition of water takes place.

The liberation of oxygen occurs at the anode ("oxygen evolution reaction" or "OER" for short) and the reduction of protons ($H^+$), which pass through the polymer electrolyte membrane, takes place at the cathode ("hydrogen evolution reaction" or "HER" for short). The result is that water is decomposed into hydrogen and oxygen with the aid of electric current. The reactions can be summarized by the following equations:

$$2\,H_2O => O_2 + 4\,H^+ + 4e- \quad\quad (OER)$$

$$4\,H^+ + 4e- => 2\,H_2 \quad\quad (HER)$$

An MEA for a PEM water electrolyser (hereinafter also referred to as "electrolysis MEA") generally contains a polymer electrolyte membrane (for example Nafion® from DuPont) which is arranged in the manner of a sandwich construction between two electrodes and two porous current collectors (or gas diffusion layers) which are each mounted on the two sides of the electrodes.

However, owing to the different requirements which electrolysis MEAs have to meet and the different operating conditions of electrolysers and conventional PEM fuel cells, there are important differences in the requirement profile for electrolysis MEAs:

(a) Owing to the corrosion which can be caused by the oxygen formed on the anode side in the OER, materials based on carbon (for example Pt/C catalysts supported on carbon black or gas diffusion layers "GDLs" based on carbon fibres) cannot be used on the anode side of an electrolysis MEA.

(b) The electrolysis process is frequently carried out under elevated pressure on the hydrogen side in order to carry out a precompression for the storage of the hydrogen. At present, pressures of up to 15 bar, in exceptional cases up to 30 bar, are reached. This means that the electrolysis MEA is subjected to a differential pressure between anode and cathode which is from about 5 to 10 times as high as in the operation of a conventional PEM fuel cell. This places increased demands on the stability and pressure resistance of the MEA. Preference is therefore given to using relatively thick membrane materials (up to a thickness of 200 µm). However, new MEA construction concepts as described in the present patent application are also necessary to increase the pressure stability.

(c) Since not only hydrogen but also oxygen is liberated during the electrolysis process, there is a latent risk of a hydrogen/oxygen gas explosion in the case of leakage. The reactants have to be strictly separated from one another to avoid such effects. This places increased demands on the gastightness of the electrolysis MEAs.

(d) Furthermore, different catalysts have to be used for electrolysis MEAs. Iridium is known for its unique electrocatalytic properties in respect of processes for the generation of chlorine and oxygen. Iridium is therefore the preferred material for the oxygen evolution reaction (OER) on the anode side, either in the form of the pure metal (as "black") or as oxide, if appropriate in admixture with other oxides. Suitable anode catalysts for electrolysis MEAs are described, for example, in the German Patent Application P 1 0350 563.6 of the applicant. Among all precious metals, platinum is the most active catalyst for the hydrogen evolution reaction (HER) at the cathode and is frequently used as cathode catalyst in electrolysis MEAs.

For these reasons, conventional MEAs as are used for PEM fuel cells cannot be used for PEM electrolysers.

Various proposals for the construction of electrolysis MEAs have become known from the patent literature. US 2003/0057088 A1 describes a PEM water electrolyser comprising MEAs which comprise an ionomer membrane, two catalyst layers and a pair of porous current collectors and are pressed in a sandwich-like manner between two electrode plates. The catalyst layers are applied on the front and rear sides of the membrane by the "decal" process. The catalyst layers, the gas diffusion layers and the membrane have the same dimensions ("coextensive design"), and the use of seals is not described.

WO 02/27845 A2 discloses a water electrolysis cell which has an "integral membrane support and frame structure" for the ionomer membrane. The catalyst layers are applied on both sides of the membrane, with large proportions of the membrane not being coated in the peripheral region. This results in a considerably increased consumption of expensive ionomer membrane, which leads to higher costs of the PEM electrolyser.

U.S. Pat. No. 6,613,215 B2 describes a PEM electrolyser containing an ultrathin composite membrane. Anode and cathode catalysts are applied on the front and rear side, respectively, of the membrane, once again with large proportions of the membrane not being coated and additional costs being incurred as a result.

The processes for producing electrolysis MEAs are in principle similar to the processes for producing conventional membrane-electrode assemblies (MEAs) for PEM fuel cells. In general, catalyst inks comprising catalyst powder, solvent and optionally polymer electrolyte material (i.e. a dissolved ionomer) are prepared and either applied directly to the ionomer membrane or firstly applied to the gas diffusion layer and then joined to the membrane (cf., for example, the patents U.S. Pat. Nos. 5,861,222; 6,309,772 and 6,500,217 of the applicant). Problems with accurate positioning and dimensional stability of the motifs occur particularly in the two-sided coating of the ionomer membranes.

It was therefore an object of the present invention to provide an electrolysis MEA which, owing to its structure, has improved pressure stability at high differential pressures (up to 30 bar) and also has improved gastightness. The electrolysis MEA should be able to be produced in a simple, inexpensive process without a high membrane consumption. The process should have low failure ranges and a high accuracy of fit and thus be suitable for mass production.

This object and others are achieved by the membrane-electrode assemblies (MEAs) of the present invention. In addition, the present invention provides processes for producing the MEAs and products for their use.

The membrane-electrode assembly of the invention for the electrolysis of water is shown in FIG. 1, with the individual components before assembly being shown schematically. The MEA comprises an ion-conducting membrane having a front side and rear side (1), a first catalyst layer on the front side (cathode side) for hydrogen evolution (2), a first gas diffusion layer on the front side (4), a second catalyst layer on the rear side (anode side) for anodic oxygen evolution (3) and a second gas diffusion layer on the rear side (5). The first gas diffusion layer (4) has smaller planar dimensions than the ion-conducting membrane (1) and the second gas diffusion layer (5) has essentially the same planar dimensions as the ion-conducting membrane (1).

Figure 2:
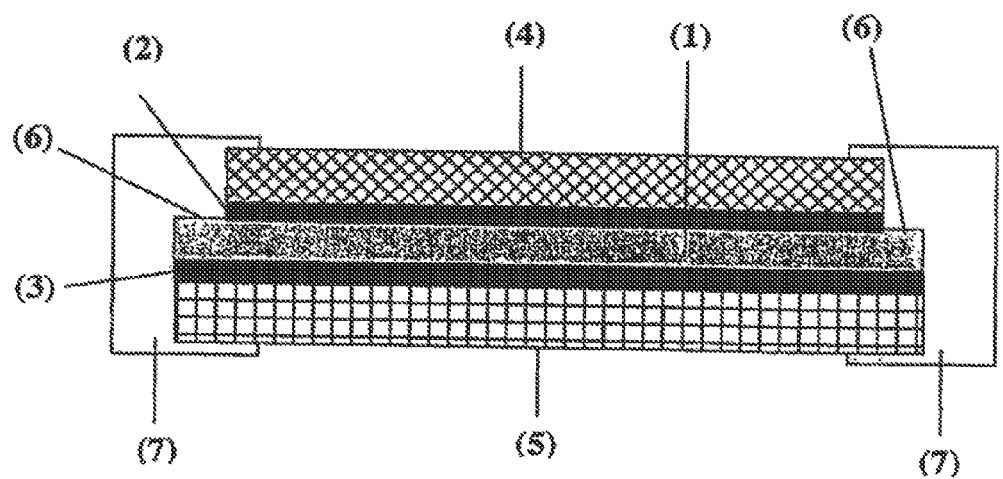

FIG. 2 shows the electrolysis MEA of the invention in the assembled state (5-layer structure). The sealing material in the peripheral region (7) surrounds the MEA in a gastight manner and, owing to the free membrane surface (6), displays improved adhesion and gastightness. Increased consumption of membrane material for sealing purposes in the peripheral region is avoided.

However, the gas diffusion layer (5) can be omitted in a further embodiment. In this case, an MEA comprising an ion-conducting membrane having a front side and rear side (1), a first catalyst layer on the front side (2), a first gas diffusion layer on the front side (4) and a second catalyst layer on the rear side (3) is obtained. This 4-layer MEA is surrounded in the peripheral region by a sealing material (7). No increased consumption of membrane material in the peripheral region occurs.

In both embodiments, the MEA according to the invention has a free membrane margin (6) which is not supported by a gas diffusion layer. The peripheral region, i.e. the distance from the outer edge of the membrane (1) to the outer edge of the smaller gas diffusion layer (4) on the cathode side, is small and in the assembled membrane-electrode assembly has a width of at least 0.5 mm around the circumference, preferably a width of at least 1 mm. For cost reasons, the width of the margin should be limited to a maximum of 5 mm around the circumference.

The electrolysis MEA of the invention as a 5-layer MEA has a "semicoextensive design" in respect of the two gas diffusion layers (4) and (5). In a "coextensive" design (as is described, for example, in US 2003/0057088 A1), the two gas diffusion layers completely cover the ionomer membrane, i.e. the membrane and the gas diffusion layers have the same dimensions and are of equal size. In this coextensive design, there is no free membrane margin which is not supported by a gas diffusion layer (cf. U.S. Pat. No. 5,176,966).

It has surprisingly been found that a significantly improved pressure stability of the electrolysis MEA at high differential pressures is achieved by means of the "semicoextensive design" or by the presence of the free membrane surface (6). Furthermore, a significantly better gastightness in the sealing of the peripheral region of the membrane-electrode assembly is obtained. This is, as indicated above, of great importance for the use of the electrolysis MEA in PEM electrolysers.

A further advantage of the electrolysis MEA of the invention is that, owing to the construction described, it has a stable structure which is easy to handle. The two catalyst layers or electrodes of the membrane-electrode assembly are physically separated from one another by a greater distance in the peripheral region as a result of the construction according to the invention. The risk of a short-circuit is significantly reduced. In the subsequent processing steps (e.g. during installation of the sealing material), there is no risk of the poles being short-circuited by, for example, fibres from the gas diffusion layers.

Owing to the small width of the free membrane surface (6), the membrane consumption is limited. This leads to considerable cost savings compared to conventional MEA products.

The "semicoextensive design" for membrane-electrode assemblies which are used for electrochemical devices in general, in particular PEM fuel cells, has been described in the German Patent Application P 103 31 836.4 (filed on Jul. 14, 2003), which is not a prior publication.

The production process for the electrolysis MEAs of the invention consists of a combined process of membrane coating ("CCM process") and gas diffusion layer coating ("CCB process"), with each of the two substrates being coated with catalyst on only one side. The problems of accurate positioning and dimensional stability in double sided printing processes are avoided in this way. However, to achieve a higher catalyst loading, one side of the substrate can be coated a number of times.

To produce the membrane-electrode assemblies, the precious metal catalysts are manufactured into inks or pastes using suitable solvents and, if appropriate, with addition of ionomer materials. The catalyst for the cathode is applied to a gas diffusion layer, and the catalyst for the anode is applied directly to the ionomer membrane. The typical catalyst loading on the anode is in the range from 0.5 to 4 mg of precious metal/$cm^2$, and catalysts comprising Ir or Ir oxide are preferably used here. Standard platinum catalysts (e.g. Pt/C or Pt black) are used on the cathode side. The cathode loadings are in the range from 0.2 to 1 mg of Pt/$cm^2$. A drying process is then generally carried out in order to remove the solvents from the catalyst inks.

The carbon-based gas diffusion layers for the cathode can comprise porous, electrically conductive materials such as graphitized or carbonized carbon fibre papers, carbon fibre nonwovens, woven carbon fibre fabrics and/or the like. The non-carbon based gas diffusion layer on the anode side can comprise a woven metal mesh, metal gauze, metal nonwoven, metal staple fibres, metal multifilament and/or another porous metallic structure. For example, sintered titanium plates (type SIKA-T10®, from GKN, Radevormwald) can be used.

The ion-conducting membrane generally comprises proton-conducting polymer materials. Preference is given to using a tetrafluoroethylene-fluorovinyl ether copolymer having sulphonic acid groups. This material is marketed under the trade name Nafion® by DuPont. However, other, particularly fluorine-free, ionomer materials such as doped sulphonated polyether ketones or doped sulphonated or sulphinated aryl ketones and doped polybenzimidazoles can also be used. Composite membranes, reinforced membranes, ceramic membranes and multilayer membrane materials can likewise be used.

For sealing or edging the membrane-electrode assemblies of the invention, it is possible to use organic polymers which are inert under the operating conditions of water electrolysis and release no interfering substances. The polymers have to be able to surround the gas diffusion layers in a gastight manner. Further important requirements which such polymers have to meet are good adhesion behaviour and good wetting properties in respect of the free surface of the ion-conducting membrane. Suitable materials are firstly thermoplastic polymers such as polyethylene, polypropylene, PTFE, PVDF, polyamide, polyimide, polyurethane or polyester, and secondly thermoset polymers such as epoxy resins or cyanoacrylates. Further suitable polymers are elastomers such as silicone rubber, EPDM, fluoroelastomers, perfluoroelastomers, chloroprene elastomers and fluorosilicone elastomers.

When precut films are used for the sealing or edging of the membrane-electrode assembly of the invention, these can be placed in a press between two appropriately precut frames of thermoplastic material. The frames are cut so that their interior cutout surrounds the shape of the respective active area as accurately as possible. The polymeric film material is then melted under the action of heat and pressure. It then forms an adhesive bond enclosing the outer region of the semicoextensive gas diffusion layers and the free surface of the membrane.

The gas diffusion layers (4, 5) of the electrolysis MEA of the invention can also be impregnated in a gastight fashion with polymer material in their peripheral region. For this purpose, frames of thermoplastic polymer can be cut so that their interior cutout surrounds the shape of the respective active area as accurately as possible. However, the total height of the frames is somewhat larger than the height of the hollow space in the pressing tool. The polymer material is then melted under the action of heat and pressure. The pressure then reduces the height of the frames to that of the pressing tool so that the polymer impregnates the peripheral region of the gas diffusion layer right through to the membrane and forms an adhesive bond enclosing the free surface of the membrane and the gas diffusion layer(s). The sealing material should penetrate into the peripheral region of the MEA to a depth of at least 1 mm, preferably at least 2 mm. Very good results in respect of pressure stability are achieved in this way.

The same result can be achieved by the use of polymeric sealing materials in liquid form. The penetration region of the sealing material can in this case be controlled by its viscosity and wetting properties. Curing of the polymeric sealing material can, depending on the polymer type, take place by contact with atmospheric moisture and/or at elevated temperature.

The invention is illustrated by the following examples without being restricted thereof.

EXAMPLES

Example 1

Production of an Electrolysis MEA
(4-Layer Structure)

To produce the 4-layer electrolysis MEA (cf. FIG. 1, but without gas diffusion layer (5)), a membrane coated on one side is manufactured in a first step. The corresponding membrane (Nafion® N 117, Du Pont) is coated over its entire area with an anode catalyst by means of screen printing as described in EP 1 1027 385. An iridium oxide powder (BET surface area about 30 m²/g, from Umicore) is used. The catalyst ink has the following composition:

| 44.4 g | of iridium oxide powder (from Umicore) |
| 46.0 g | of Nafion ® solution (10% by volume in water, from DuPont) |
| 9.6 g | of propylene glycol solvent |
| 100.0 g | |

The catalyst loading is 2 mg of Ir/cm². The catalyst-coated membrane is subsequently dried at 90° C. The required format (stamp dimensions 5×5 cm; active area 25 cm²) is then stamped out so that one side of the membrane is coated with catalyst over its entire area.

In a second step, an electrode is manufactured from a gas diffusion layer (Sigracet 30 BC, hydrophobicized, with microlayer; from SGL, Meitingen). For this purpose, the gas diffusion layer is coated by means of screen printing with a paste having the following composition:

| 18.5 g | of Pt/C catalyst (60% by weight of platinum on carbon black; from Umicore) |
| 55.0 g | of Nafion ® (10% by weight in water, from DuPont) |
| 26.5 g | of propylene glycol |
| 100.0 g | |

The catalyst loading is 0.57 mg of Pt/cm². The gas diffusion layer is subsequently dried at 110° C. A format (stamp dimensions 4.7×4.7 cm, active area 22.1 cm²) is stamped from the gas diffusion layer which has been coated on one side with catalyst, so that the electrode obtained is coated with catalyst over its entire area.

In a third step, a 4-layer MEA is produced by laminating the coated membrane and the coated gas diffusion layer to one another so that the catalyst layer of the gas diffusion layer is bound to the still uncoated side of the membrane. A margin of free membrane having a width of 1.5 mm is obtained around the periphery of the arrangement. Lamination is carried out at 150° C. under a pressure of 150 N/cm².

In a forth step, the MEA described is provided with a frame of sealing material which allows installation in the electrolyser and good sealing. A pressing tool which has a recess having the dimensions 120×120×0.5 mm³ is used. The 4-layer MEA together with two frames of Vestamelt® (polyamide; from Degussa, Dusseldorf) are placed in this recess. The frames each have external dimensions of 11×11 cm and a height of 0.29 mm. One frame has internal dimensions of 4.7×4.7 cm, and the other has internal dimensions of 5×5 cm. The charged pressing tool is placed in a hot press and pressed for 60 seconds at a heating surface temperature of 170° C. At the end of the pressing time, a pressing force of at least 10 tonnes is reached. After cooling of the pressing tool, the electrolysis MEA is taken out and stamped to produce the final dimensions.

Two MEAs produced by this process were each joined on the anode side to a sintered titanium plate (SIKA-T10®, thickness 2 mm; from GKN, Radevormwald) having dimensions of 4.9×4.9 cm and installed in an electrolysis cell. A current/voltage curve is recorded in each case at a cell temperature of 80° C. under atmospheric pressure. The following values for the electrolysis voltage at various current densities are obtained:

| Sample No. | Voltage @ 600 mA/cm$^2$ | Voltage @ 1000 mA/cm$^2$ |
|---|---|---|
| 1 | 1805 mV | 1987 mV |
| 2 | 1808 mV | 1984 mV |

Example 2

Production of an Electrolysis MEA (5-Layer Structure, Semicoextensive Design)

The production of a 5-layer electrolysis MEA (cf. FIG. 2) is carried out in principle as described in Example 1. However, a gas diffusion layer which is not based on carbon (in this case a porous nonwoven structure having dimensions of 5×5 cm, thickness 0.09 mm, produced from Bekinit® titanium fibres, from Baekaert, Zwevegem, The Netherlands) is placed directly on the anode catalyst layer on the anode side before the fourth step (i.e. the application of the sealing material) is carried out. The total height of the frames of sealing material is increased by the thickness of the titanium nonwoven compared to Example 1.

Once again, a pressing tool in whose recess the 5-layer MEA together with two frames of Vestamelt® (from Degussa, Dusseldorf) are placed is used. The frames each have external dimensions of 11×11 cm. One frame has internal dimensions of 4.7×4.7 cm and a height of 0.29 mm. The other frame has internal dimensions of 5×5 cm and a height of 0.38 mm. The charged pressing tool is placed in a hot press and pressed for 60 seconds at a heating surface temperature of 170° C. At the end of the pressing time, a pressing force of at least 10 tons is reached. After cooling of the pressing tool, the workpiece is taken out and stamped to produce the final dimensions. A pressure-stable electrolysis MEA which is sealed in the peripheral region and can be installed directly in a PEM water electrolyser is obtained.

The invention claimed is:

1. A membrane-electrode assembly for the electrolysis of water, comprising
   an ion-conducting membrane having a front side and a rear side
   a first catalyst layer on the front side
   a first gas diffusion layer on the front side
   a second catalyst layer on the rear side
   a second gas diffusion layer on the rear side
wherein the first gas diffusion layer has smaller planar dimensions than the ion-conducting membrane and the second gas diffusion layer has essentially the same planar dimensions as the ion-conducting membrane, wherein the ion-conducting membrane has a free surface which is not supported by a gas diffusion layer on the front side and wherein the margin of the gas diffusion layers and the free surface of the ion-conducting membrane are surrounded by a sealing material which penetrates into the peripheral region of the membrane-electrode assembly to a depth of at least 1mm.

2. A membrane-electrode assembly according to claim 1, wherein the first catalyst layer on the front side and the second catalyst layer on the rear side of the ion-conducting membrane have different planar dimensions.

3. A membrane-electrode assembly according to claim 1, wherein the catalyst layers on the front side and on the rear side comprise catalysts comprising precious metals and optionally ion-conducting materials.

4. A membrane-electrode assembly according to claim 1, wherein the gas diffusion layer on the front side comprises a carbon-based material, such as a graphitized or carbonized carbon fibre paper, a carbon fibre nonwoven, a woven carbon fibre fabric or a similar material, and the gas diffusion layer on the rear side comprises a non-carbon based material, such as a woven metal mesh, a metal nonwoven, a gauze, a metal staple fibre, a metal multi-filament or another porous metallic structure.

5. A membrane-electrode assembly according to claim 1, wherein the ion-conducting membrane comprises an organic polymer such as a proton conducting perfluorinated polymeric sulphonic acid compound, a doped polybenzimidazole, a polyether ketone, a polysulphone or an ion-conducting ceramic material and has a thickness between about 10 and about 200 µm.

6. A membrane-electrode assembly according to claim 1, wherein the second catalyst layer on the rear side comprises a catalyst containing a precious metal for anodic evolution of oxygen, preferably a catalyst based on iridium or ruthenium.

7. A membrane-electrode assembly according to claim 1, wherein the sealing material comprises a thermoplastic polymer from the group consisting of polyethylene, polypropylene, polytetrafluoroethylene, PVDF, EPDM, polyester, polyamide, polyamide elastomers, polyimide, polyurethane, silicones, silicone elastomers, and/or a thermoset polymer from the group consisting of epoxides and cyanoacrylates.

8. A process for producing the membrane-electrode assembly according to claim 1, which comprises the steps of:
   (a) coating an ionomer membrane with catalyst on one side;
   (b) coating a carbon-based gas diffusion layer with catalyst on one side;
   (c) joining the carbon-based, catalyst-coated gas diffusion layer to the uncoated side of the ionomer membrane, with the catalyst layer of the gas diffusion layer coming into contact with the ionomer membrane;
   (d) applying a non-carbon based gas diffusion layer to the coated side of the ionomer membrane, with the catalyst layer on the ionomer membrane coming into contact with the non-carbon based gas diffusion layer; and
   (e) applying a sealing material in the peripheral region of the assembly, so that the sealing material penetrates into the peripheral region of the assembly to a depth of at least 1 mm.

9. A process according to claim 8, wherein the joining of the carbon-based, catalyst-coated gas diffusion layer to the uncoated side of the ionomer membrane is carried out at elevated temperature and/or elevated pressure.

10. A process according to claim 8, wherein the application of the sealing material is effected by means of melting processes, injection moulding, heat pulse welding and/or hot pressing.

11. An electrolyser, regenerative fuel cell, oxygen-producing electrode or another electrochemical device comprising the membrane-electrode assembly according to claim 1.

* * * * *